United States Patent
Bachmann (10) Patent No.: US 8,075,436 B2
(45) Date of Patent: Dec. 13, 2011

(54) HYBRID DRIVE TRAIN OF A MOTOR VEHICLE

(75) Inventor: Max Bachmann, Bad Waldsee (DE)

(73) Assignee: ZF Friedrichshafen, AG, Friedrichahfen (DE)

( * ) Notice: Subject to any disclaimer, the term of this patent is extended or adjusted under 35 U.S.C. 154(b) by 435 days.

(21) Appl. No.: 12/519,372

(22) PCT Filed: Dec. 3, 2007

(86) PCT No.: PCT/EP2007/063118
§ 371 (c)(1),
(2), (4) Date: Jun. 16, 2009

(87) PCT Pub. No.: WO2008/074614
PCT Pub. Date: Jun. 26, 2008

(65) Prior Publication Data
US 2010/0009805 A1    Jan. 14, 2010

(30) Foreign Application Priority Data

Dec. 16, 2006  (DE) .......................... 10 2006 059 591

(51) Int. Cl.
*F16H 3/72* (2006.01)
(52) U.S. Cl. ................. 475/5; 475/209; 475/218; 477/3
(58) Field of Classification Search .............. 475/5, 207, 475/208, 209, 218; 477/3
See application file for complete search history.

(56) References Cited

U.S. PATENT DOCUMENTS

| 6,645,105 | B2 * | 11/2003 | Kima | 475/5 |
| 7,575,529 | B2 * | 8/2009 | Holmes | 475/5 |
| 7,597,644 | B2 * | 10/2009 | Rodgers, II | 475/218 |
| 2003/0045389 | A1 | 3/2003 | Kima | |
| 2007/0087884 | A1 | 4/2007 | Janssen | |

FOREIGN PATENT DOCUMENTS

| DE | 198 49 156 A1 | 9/1999 |
| DE | 199 40 288 C1 | 3/2001 |
| DE | 102 28 636 A1 | 4/2003 |
| DE | 10 2004 005 349 A1 | 8/2005 |
| EP | 0 845 618 A2 | 6/1998 |

* cited by examiner

*Primary Examiner* — Ha D. Ho
(74) *Attorney, Agent, or Firm* — Davis & Bujold, P.L.L.C.

(57) ABSTRACT

A hybrid gear train of a motor vehicle that has an internal combustion engine with a drive shaft, an electric motor with a rotor that operate as a motor and a generator, a transmission with two input shafts and an output shaft, as well as a differential transmission. At least one of the input shafts can be connected, via an assigned de-coupler, to the drive shaft, both of the input shafts can be connected by alternately assigned gearwheel sets of different ratios and in each case one assigned gear clutch to the output shaft. The differential transmission is designed as a simple planetary gearset that is coaxial with the first input shaft. The ring gear of this transmission is rotationally fixed to the one input shaft. The planet carrier is rotationally fixed to the second input shaft, and the sun gear is connected to and drives the rotor.

27 Claims, 9 Drawing Sheets

HYBRID DRIVE TRAIN OF A MOTOR VEHICLE

This application is a National Stage completion of PCT/EP2007/063118 filed Dec. 3, 2007, which claims priority from German patent application serial no. 10 2006 059 591.2 filed Dec. 16, 2006.

FIELD OF THE INVENTION

The invention relates to a hybrid drive train of a motor vehicle that comprises an internal combustion engine with a driveshaft, an electric motor that can be operated as an engine and a generator and has a rotor, a multi-stage manual transmission with two input shafts and one output shaft, as well as a differential transmission, whereby at least one of the input shafts can be can be connected to the driveshaft by means of an assigned decoupler. Both input shafts can be selectively connected to the output shaft by means of alternately assigned gearwheel sets of different ratios and respectively one assigned gear clutch. The differential transmission is designed as a simple planetary gearset that is arranged coaxially with the first input shaft. The ring gear thereof is connected, in a rotationally fixed manner, to the one input shaft, its planet carrier is connected rotationally fixed manner to the other input shaft, and its sun gear has a driving connection with the rotor. Furthermore, the invention relates to a method of controlling this kind of hybrid drive train.

BACKGROUND OF THE INVENTION

A hybrid drive train of a motor vehicle with a parallel operating arrangement of an internal combustion engine and an electric motor can be, in connection with a manual transmission arranged downstream in terms of drive technology, constructed in such a geometrically simple way, that the electric motor is arranged coaxially on the input shaft of the transmission. The electric motor is rotationally fixed to the input shaft of the transmission, and the driveshaft of the internal combustion engine can be connected to the input shaft of the transmission via a controllable decoupler, that can be engaged and disengaged.

In this case, the electric motor can be selectively shifted without power during driving operation, for use as a generator to charge an electrical energy store, or for use as an electric motor for driving the motor vehicle. During motor operation, the electric motor, with an engaged decoupler, particularly during rapid acceleration and when driving up a steep incline, can be used to support the internal combustion engine in so-called boost operation, and with a disengaged decoupler, particularly starting and when driving in inner-city areas with limits on emissions, the electric motor can be used as the only drive motor in purely electrical operation.

However, one disadvantage of this kind of hybrid drive train is that the engine-speed level of the electric motor is identical to that of the internal combustion engine, and the electric motor must therefore be constructed as relatively large and heavy in order to achieve adequate output in the electrically powered mode. However, in connection with an axially parallel arrangement of the electric motor and a drive connection of the rotor of the electric motor to the input shaft of the transmission by means of an input stage with a high ratio, such as a pair of spur gears or a continuously variable transmission, the electric motor can be designed to have lower output and be smaller in size. However, a significant disadvantage of this hybrid drive train is the interruption in the flow of force during shifting operations, which results in poor driving performance and less comfort.

Various forms of construction of hybrid drive trains have therefore been proposed, in which the electric motor, in terms of drive technology, is integrated by means of a differential transmission with three drive elements, whereby the first drive element has a drive connection with an input shaft of the transmission that can be connected to the internal combustion engine by means of a decoupler, the second drive element has a drive connection with the rotor of the electric motor, and the third drive element has a drive connection with an additional transmission shaft of the gearshift, for example the output shaft or a second input shaft.

A first hybrid drive train of this type is described in DE 198 49 156 A1, with regard to the embodiment of the to Claims and FIG. 2 in particular. The transmission in question features an input shaft and an output shaft which can be selectively connected in each case with assigned gearwheel sets of different gear ratios by means of an assigned clutch. The driveshaft of the internal combustion engine can be connected by means of a controllable decoupler to the input shaft of the transmission. The electric motor is arranged coaxially in a contact-free manner about the input shaft of the transmission. The differential transmission is designed as a simple planetary gearset with a sun gear, a planet carrier that carries a plurality of planetary gears whose gear teeth engage the sun gear, and a ring gear whose gear teeth engage one of the planet gears, which is also arranged coaxially about the input shaft of the transmission. The planet carrier forms the first drive element of the differential transmission and is rotationally fixed with the input shaft of the transmission. The sun gear forms the second drive element of the differential transmission and is rotationally fixed with the rotor of the electric motor. The ring gear forms the third element of the differential transmission and has a drive connection to the output shaft of the transmission by means of decoupling stage comprised of a pair of spur gears.

The differential transmission forms a parallel power branch to the gearshift, whereby the percentage or the magnitude of the power transmission of the differential transmission can be regulated by activation of the electric motor. During a shifting operation, it is provided that the torque of the internal combustion engine is more or less completely transmitted through the differential transmission before the engaged gear under load is disengaged, the target gear is synchronized, and then the next gear engaged. Then the electric motor is shifted without power and, in this way, the torque of the internal combustion engine is again completely transmitted via the gearshift to the output shaft.

However, because the synchronization of the target gear is suppose to take place via the relatively sluggish engine control, there are long response times and a correspondingly high electric output of the electric motor in order to support the torque that is transmitted. In order to enable the supporting function, the electric motor must be designed for at least the maximum torque of the internal combustion engine, reduced by the effective ratio, because otherwise torque interruptions could occur during the shifting operations. During normal driving operation, i.e., with an engaged decoupler and a gear engaged in the transmission, the electric motor can be used as a generator for charging an electric energy storage or as an engine to support the internal combustion engine. When the transmission is in neutral, and the output shaft is blocked, and the internal combustion engine can be started using the electric motor. When the transmission is in neutral, with an engaged or a missing decoupler, and a running internal combustion engine, starting can take place using the electric motor by means of a continuous increase of the support torque, at least until synchronous operation of the clutch of the first gear is reached, and the clutch can be engaged. Purely electric drive operation, with the electric motor as the only drive engine, is possible with a disengaged decoupler and with an engaged gear in the gearshift, but even with an engaged first gear, particularly in order to start the vehicle, this would produce an unfavorably low overall gear ratio of the electric motor compared to the output shaft.

An additional hybrid drive train of this type is known from EP 0 845 618 B1. The transmission described here features two coaxially arranged input shafts that can be selectively connected, in each case by means of an assigned clutch, with the output shaft using alternately assigned gearwheel sets of different ratios. The driveshaft of the internal combustion engine can be, in each case, connected to the two input shafts by means of a controllable decoupler. The electric motor is arranged axially parallel to the two input shafts. The differential transmission is designed as a simple planetary gearset with a sun gear, a planet carrier that carries a plurality of planet gears whose teeth engage the sun gear, and a ring gear whose gear teeth engage the planet gears, and the electric motor is arranged about the first input shaft. The planet carrier forms a first drive element of the differential transmission and is rotationally fixed to the first input shaft of the gearshift. The sun gear forms a second drive element of the differential transmission and has a drive connection to the rotor of the electric motor by means of an input constant consisting of two gearwheels. The ring gear forms a third drive element of the differential transmission and is rotationally fixed to the second input wheel.

During normal drive operation, one decoupler is engaged and a gear assigned to the respective input shaft is engaged. The other decoupler can also be engaged, in which case the differential transmission revolves in a fixed manner. In this operating state, all of the gears assigned to the input shaft in question must be disengaged, otherwise the gearshift would be locked. The rotational speed of the rotor of the electric motor corresponds to the multiplication of the rotational speed of the internal combustion engine determined by the ratio of the input constants. During this phase of operation, the electric motor can be used as a generator for charging an electrical energy storage facility or as an engine to support the internal combustion engine.

During a shifting operation from a gear under load assigned to an input shaft to a target gear assigned to the other input shaft, it is provided that the electric motor is first shifted without power. If the decoupler that is assigned to the other input shaft is engaged, it is disengaged. Then the clutch of the target gear is synchronized using the electric motor and subsequently engaged. Then the clutch of the gear under load is controlled without load by means of the electric motor and subsequently disengaged. Finally, the other input shaft is accelerated or decelerated, using the electric motor, to the synchronous rotational speed of the other assigned decoupler, and then finally, the decoupler in question is engaged. After the shifting operation, the electric motor can be shifted without power or put into generator operation.

In this way, the shifting operations take place without interruption of traction, but are relatively elaborate and time-consuming. Due to the external synchronization by the electric motor, the clutches can be designed as unsynchronized claw couplings. However, because of the two decouplers, the input constants, the axially parallel arrangement of the electric motor and the axially adjacent arrangement of the gear-wheel sets, the constructional complexity and construction space requirements of this known hybrid drive train are unfavorable.

SUMMARY OF THE INVENTION

Against this background, the objective of the invention is to propose a hybrid drive train of a motor vehicle of the initially proposed type which, with a simple and space-saving construction, will enable high overall gear ratio of the electric motor in relation to the output shaft of the gearshift and show improved controllability. Furthermore, a method of controlling the hybrid train of the invention will be specified.

The invention initially relates to a hybrid drive train of a motor vehicle that has an internal combustion engine with a drive shaft, an electric motor that can be operated as an engine and a generator with a rotor, a multi-stage gearshift with two input shafts and one output shaft, as well as a differential transmission, whereby at least one of the input shafts can be connected to the driveshaft by means of an assigned decoupler. Both of the input shafts can be selectively connected to the output shaft by means of alternately assigned gearwheel sets of different ratios and, in each case, an assigned clutch, and the differential transmission is designed as a simple planetary gearset, which is arranged coaxially about the first input shaft. The ring gear of this planetary gearing is rotationally fixed to one input shaft. The planetary carrier of this planetary gearing is rotationally fixed with the other input shaft, and the sun gear of this planetary gearing has a drive connection with the rotor.

In addition, it is provided in the case of this hybrid transmission that only the first input shaft of the gearshift, which is rotationally fixed with the ring gear of the planetary gearing, can be connected to the driveshaft of the internal combustion engine by means of a decoupler, and that the gearshift, as a countershaft transmission, with a coaxially stacked arrangement of the two input shafts, is designed with an arrangement of the output shaft that is coaxially adjacent to this arrangement of the two input shafts, and with two countershafts, each of which has a drive connection to one of the two input shafts by means of a separate input constant. The gearwheel sets of the gearshift are arranged alternately on the first countershaft and on the output shaft, as well as on the second countershaft and on the output shaft respectively.

Accordingly, the hybrid drive train of the invention features two transmission branches for transmitting a torque from the internal combustion engine to the output shaft that is connected to an axle drive, a driven vehicle axle or a central differential. The first power branch comprises the decoupler, the first input shaft, the first input constant, as well as the clutch and the gearwheel set of an engaged gear that is assigned to the first input shaft. The transmission of torque, via this first transmission branch, takes place purely mechanically. With the rotational speed $n_{VM}$ of the driveshaft of the internal combustion engine, the rotational speed $n_{GA}$ of the output shaft of the gearshift, the ratio of the first input constant $i_{EK1}$, which is connected to the first input shaft and with the ratio of the gearwheel set of an engaged gear $i_{G1*}$ that is assigned to the first input shaft, the ratio between the internal combustion engine and the output of the gearshift is:

$$n_{VM}/n_{GA}=i_{EK1}*i_{G1*}.$$

The second transmission branch comprises the decoupler, the first input shaft, the ring gear, and the planet carrier with the planetary gears of the planetary gearset, the second input shaft, the second input constant, and the clutch, and the gear-wheel set of an engaged gear that is assigned to the second input shaft. The transmission of a torque by this second transmission branch also takes place mechanically in principal. However, for transmission of the torque via the planetary gearing, support for the sun gear is required from the electric motor with which it is in drive connection. In this way, the torque that is transmitted via the second transmission branch can be regulated by means of the electric motor, which results in advantageous control characteristics. With the ratio of the second input constant that is connected to the second input shaft $i_{EK2}$, the ratio of the gearwheel set of an engaged gear $i_{G2*}$ assigned to the second input shaft, and with the stationary gear ratio $i_{St}$ of the planetary gearing, the ratio between the internal combustion engine and the output shaft of the gearshift, with exact support, i.e., when the sun gear of the planetary gearing is at a standstill:

$$n_{VM}/n_{GA}=(1+1/i_{St})*i_{EK2}*i_{G2*}.$$

In purely electrical operation, torque of the electric motor is induced by means of the sun gear into the planetary gearset, and from there, with a disengaged decoupler and with one engaged gear in each case, the torque is transmitted via both transmission branches to the output shaft, which produces the effective ratio from the combination of the ratios of the gearwheel sets of the two engaged gears, the ratios of the two input constants, and the stationary gear ratio of the planetary gearing. The rotational speed conditions, in the planetary gearset, are generally given with the rotational speed of the sun gear $n_S$, the rotational speed of the planetary carrier $n_{PT}$ and the rotational speed of the ring gear $n_H$ by means of the equation:

$$n_S=(1+i_{St})*n_{PT}-i_{St}*n_H.$$

Hence, the ratio between the sun gear of the planetary gearset that is in drive connection with the rotor of the electric motor and the output shaft of the gearshift is:

$$n_S/n_{GA}=(1+i_{St})*i_{EK2}*i_{G2}-i_{St}*i_{EK1}*i_{g1*}.$$

With an appropriate selection of ratios, particularly of the gearwheel sets and their assignment to the two input shafts, an extremely high gear ratio can be achieved that is particularly suitable for electromotor starting with a high starting load. In addition, the countershaft construction of the gearshift results in a coaxial arrangement of the driveshaft of the internal combustion engine and the output shaft of the transmission that is particularly advantageous for the longitudinal installation of the hybrid drive train, as well as resulting in compact dimensions of the hybrid drive train, particularly in an axial direction.

In order to achieve the most compact dimensions possible for the hybrid drive train, the electric motor is preferably arranged coaxially about the first input shaft, whereby the rotor of the electric motor is directly rotationally fixedly to the sun gear of the planetary gearset. The rotational speed of the rotor of the electric machine $n_{EM}$ is then equal to the rotational speed of the sun gear of the planetary gearset $n_S$, so that the ratio between the rotor of the electric motor and the output shaft of the gearshift, with one engaged gear in each transmission branch respectively, is given as:

$$n_{EM}/n_{GA}=(1+i_{St})*i_{EK2}*i_{G2*}-i_{St}*i_{EK1}*i_{G1*}.$$

In order to guarantee, with this arrangement, the transmission of the maximum torque $M_{VM\_max}$ of the internal combustion engine via the second transmission branch, the electric motor shows a maximum torque $M_{EM\_max}$, which corresponds at least to the part of the maximum torque $M_{VM\_max}$ of the internal combustion engine that is formed with the stationary gear ratio $i_{St}$ of the planetary gearing ($M_{EM\_max}>=1/i_{St}*M_{VM\_max}$).

However, in order to construct the electric motor in such a way that it produces even weaker torque and can thus be smaller and lighter than the previously described embodiment, it is possible to arrange the electric motor axially parallel adjacent to the first input shaft, whereby the rotor of the electric motor, by means of an input constant with a ratio $i_{EK}$ greater than One is in drive connection with the planetary gearing ($i_{EK}>1.0$).

As the rotational speed $n_{EM}$ of the rotor of the electric machine amounts to the multiple of the rotational speed of the sun gear of the planetary gearing $n_S$ that is formed with the ratio of the input constants $i_{EK}$, the ratio between the rotor of the electric motor and the output shaft of the gearshift, with a gear engaged in both transmission branches in each case, is given as:

$$n_{EM}/n_{GA}=i_{EK}*[(1+i_{St})*i_{EK2}*-i_{G2*}-*i_{St}*i_{EK1}*i_{G1*}].$$

The associated input constant is preferably constructed as a gearwheel pair comprised of two spur gears; alternatively, it can be constructed as a belt drive or a chain drive. In order to achieve, with this arrangement, the transmission of the maximum torque $M_{VM\_max}$ of the internal combustion engine via the second transmission branch, the electric motor advantageously has a maximum torque of $M_{eM\_max}$, which corresponds to at least the part of the maximum torque $M_{VM\_max}$ of the internal combustion engine that is formed by the product of the ratio $i_{EK}$ of the input constants of the electric motor and the stationary gear ratio $i_{St}$ of the planetary gearing £ (($M_{EM\_max}>=1/(i_{St}*i_{Ek})*M_{VM\_max}$).

When there is torque support for a torque transmitted by the planetary gearset, there is nominally no output, because the sun gear is at a standstill. But electric output is still consumed in the electric motor in order to produce the required torque support for the sun gear due to the ohmic resistances in the exciter winding, which, at least over an extended period of time, is disadvantageous. It is therefore advantageous for extended operating phases with power transmission by means of the same gear of the second transmission branch, i.e., for stationary support of a transmitted torque, if a controllable brake is arranged between the sun gear of the planetary gearing or the rotor of the electric motor, along with a component that is fixed to the housing. This brake is advantageously engaged during stationary driving with a gear assigned to the second input shaft, i.e., outside of acceleration and delay phases that are associated with shifting operations, thereby avoiding the cited energy consumption of the electric machine.

In the transmission, the gearwheels of the odd numbered gears are arranged on the first countershaft and the output shaft, and are therefore assigned to the first input shaft; and the gearwheels of the even numbered gears, as well as a reversing stage are arranged on the second countershaft and on the output shaft, and are therefore assigned to the second input shaft.

In this way, with a simultaneously engaged first gear and an engaged reversing stage, a particularly large gear ratio is produced between the rotor of the electric motor and the output shaft, which is particularly suited for starting, using the electric motor, with a heavy starting load. In addition, in this case, the torques transmitted in both transmission branches have a driving effect on the output shaft, so that there is no idle power that reduces the effectiveness of the power transmission. The reversing stage does not necessarily have to be configured as a reverse gear with a high negative ratio, because starting in reverse using the electric motor can take place with the same overall gear ratio as with the corresponding forward-starting operation by simply reversing the rotational direction of the electric motor.

In order to achieve a particularly compact method of construction of the gearshift, and thus the entire hybrid drive train, the input constants of the two countershafts, which are in each case designed as a pair of spur gears, advantageously have a ratio that is larger than one ($i_{EK1}>1.0$; $i_{EK2}>1.0$). In this way, the ratios of the gearwheel sets can be correspondingly smaller, and in that way, the radial distance between the countershafts and the output shaft reduced.

In addition, the gearwheels sets are in each case constructed of a fixed wheel that is attached to the output shaft in a rotationally fixed manner and an idler wheel that is rotationally fixed to the assigned countershaft, and the idler wheels can in each case be connected by means of an assigned gear clutch to the assigned countershaft, whereby the gear clutches in each case are combined in pairs in common shift packs. The gearset of the reversing stage, in the known manner, has an additional intermediate wheel for reversing the direction of rotation that is arranged on a separate shaft.

Arranging the clutches on the countershaft results, on the one hand, in the best possible nesting of the gearwheel set with the smallest possible axial distance between the gearwheel sets, as well as the best possible accessibility of the gear clutches, for example by means of the shift forks of the shift rods. Similarly, this also makes it possible to have at least one gearwheel set that is arranged on the first countershaft and one gearwheel set that is arranged on the output shaft, as well as one gearwheel set that is arranged on the second countershaft and one gearwheel set that is arranged on the output shaft to be arranged in the same axial position and to have a common fixed wheel.

It is also an advantage to have a direct gear clutch arranged between one of the two input shafts and the output shaft, by which means, in a simple and space-saving way, a direct gear with the ratio i=1.0 is created, and a corresponding gearwheel set can be dispensed with.

In order to conserve energy for reciprocal support during electric-motor drive mode and in order to avoid the idle power associated with it, a controllable brake can be arranged on each of the two countershafts in order to support the torque transmitted by the other input shaft. This brake has a connection with a component that is fixed to the housing. If one of the two brakes is engaged, and in that way the assigned input shaft is stopped by the housing through the assigned countershaft and the respective input constant, the planetary gearset operates as a stationary transmission with a fixed ring gear, or with a fixed planetary gearset. In order to keep the installation space for the two brake clutches as small as possible, they are preferably identical in structure and arrangement to the cited clutches and incorporated in terms of control technology into the actuation of the clutches.

Below is a description of how the hybrid drive train of the invention can be operated.

For starting with the electric motor, it is provided that the decoupler is disengaged, that a clutch of a gear assigned to the first input shaft and a clutch of a gear assigned to the second input shaft are engaged, and that subsequently, the electric motor is accelerated during engine operation, whereby the selection of the two gears to be engaged is done independently of the starting load.

When there is a high starting load, as for example when starting on an incline with a heavy vehicle payload, the clutch of the lowest gear of the first input shaft and the clutch of the reversing stage of the second input shaft are engaged, and the electric motor, in relation to the rotational direction of the driveshaft of the internal combustion engine, is accelerated forward when starting in a forward direction and in reverse when starting in a reverse direction. In this way, there is the greatest possible reduction between the rotor of the electric motor and the output shaft of the gearshift, and both transmission branches have a drive effect on the output shaft, in this way avoiding idle power and achieving a greater degree of transmission efficiency.

With a direct connection of the rotor of the electric motor to the sun gear of the planetary gearset, and with a stationary gear ratio of the planetary gearing of $i_{St}=3.0$, a ratio of the input constants of the first input shaft of $i_{EK1}=2.5$, a ratio of the gearwheel set of the first gear assigned to the first input shaft of $i_{G1}=2.4$, a ratio of the input constants of the second input shaft of $i_{EK2}=1.28$, and a ratio of the gearwheel set of the reversing stage assigned to the second input shaft of $i_R=-0.88$, there is, for example a resulting ratio of:

$$n_{EM}/n_{GA}=(1+i_{St})*i_{EK2}*i_R-i_{St}*i_{EK1}*i_{G1}=-22.5.$$

With a medium starting load, such as when starting on level ground with a medium-sized load, the clutch of the lowest gear of the first input shaft and the clutch of the highest gear of the second input shaft are engaged, and the electric motor, in relation to the rotational direction of the driveshaft of the internal combustion engine is accelerated in forward direction in the case of a forward start, and in reverse direction when starting in reverse.

This results in an intermediate ratio between the rotor of the electric motor and the output shaft of the gearshift, and idling results from partial reaction coupling of the transmitted torque. With a direct connection of the rotor of the electric motor to the sun gear of the planetary gearset, and with a stationary gear ratio of the planetary gearset of $i_{St}=3.0$, a ratio of the input constants of the first input shaft of $i_{EK1}=2.5$, a ratio of the gearwheel set of the first gear assigned to the first input shaft of $i_{G1}=2.4$, a ratio of the input constants of the second input shaft of $i_{EK2}=1.28$, and a ratio of the gearwheel set of the fourth gear, which is assigned to the gearwheel set of the second input shaft, of $i_{G4}=0.82$, there is, for example, a resulting ratio of:

$$n_{EM}/n_{GA}=(1+i_{St})*i_{EK2}*i_{G4}-i_{St}*i_{EK1}*i_{G1}=-13.8.$$

With a low starting load, as is the case, for example, when starting on a gradient or on level ground with a low payload, the clutch of the highest gear of the first input shaft and the clutch of the lowest gear of the second input shaft are engaged, and the electric motor, in relation to the rotational direction of the driveshaft of the internal combustion engine, is accelerated in forward direction in the case of a forward start, and in reverse direction in the case of a start in the reverse. This results in a relatively lower ratio between the rotor of the electric motor and the output shaft of the gearshift, and idling results from partial reverse coupling of the transmitted torque.

With a direct connection of the rotor of the electric motor to the sun gear of the planetary gearset and with a stationary gear ratio of the planetary gearing of $i_{St}=3.0$, and a fifth gear of the first input shaft that is configured as direct gear with the ratio $i_{G5}=1.0$, a ratio of the input constants of the second input shaft of $i_{EK2}=1.28$, and a ratio of the gearwheel set of the second gear assigned to the second input shaft of $i_{G2}=1.94$, there is, for example, a resulting ratio of:

$$n_{EM}/n_{GA}=(1+i_{St})*i_{EK2}*i_{G2}-i_{St}*i_{G5}=6.9.$$

For electric motor starting, a brake clutch assigned to the first input shaft can be engaged instead of a clutch of the first input shaft. In that way, the planetary gearset becomes a stationary transmission with arrested ring gear, and the following applies between the rotational speed of the sun gear $n_S$ and the rotational speed of the planetary gearset $n_{PT}$:

$$n_S = (1+i_{St})*n_{PT}$$

With a direct connection of the rotor of the electric motor with the sun gear of the planetary gearset and with a stationary transmission of the planetary gearset of $i_{St}=3.0$, a ratio of the input constants of the second input shaft of $i_{EK2}=1.28$, and a ratio of the gearwheel set of the second gear assigned to the second input shaft of $i_{G2}=1.94$, there is, for example, a resulting ratio of:

$$n_{EM}/n_{GA} = (1+i_{St})*i_{EK2}*i_{G2} = 9.9.$$

In the same way, for starting with the electric motor, a brake clutch assigned to the second input shaft can be engaged instead of a clutch of the input shaft. In that way, the planetary gearset becomes a stationary transmission with an arrested planet carrier, and the following applies between the rotational speed of the sun gear $n_S$ and rotational speed of the ring gear $n_H$:

$$n_S = -i_{St}*n_H$$

With a direct connection of the rotor of the electric machine to the sun gear of the planetary gearset, and with a stationary gear ratio of the planetary gearset of $i_{St}=3.0$, a ratio of the input constants of the first input shaft of $i_{EK1}=2.5$, and a ratio of the gearwheel set of the first gear assigned to the first input shaft of $i_{G1}=2.4$, there is then, for example, a resulting ratio of:

$$n_{EM}/n_{GA} = -i_{St}*i_{EK1}*i_{G1} = -18.0.$$

If the drive torque of the electric motor is insufficient for a desired starting acceleration, for example due to insufficient charging of the assigned electrical energy store, the electric motor can be supported, with the internal combustion engine operating, by means of an at least partial engagement of the decoupler of the internal combustion engine.

With sufficient electrical energy, the previously shifted-off internal combustion engine will preferably be impulse-started by engaging the decoupler when a predefined minimum rotational speed of the first input shaft of the internal combustion engine has been reached or exceeded.

Load assumption by the internal combustion engine generally occurs by means of the first input shaft of the decoupler being engaged when the first input shaft reaches the rotational speed of the internal combustion engine, and by the torque of the internal combustion engine being increased and the torque of the electric motor being reduced to zero, under some circumstances, in a temporally overlapping manner. From this, it also follows that the gear engaged in the first transmission branch, i.e., the gear assigned to the first input shaft, is selected in such a way that after load assumption by the internal combustion engine, the desired gradeability and acceleration capability of the motor vehicle is available.

Outside of the acceleration and delay phases in connection with shifting operations, i.e., in largely stationary drive operation, a brake clutch assigned to the electric motor will advantageously be engaged in order to support a torque transmitted from the internal combustion engine via the second input shaft, and consequently electric power dissipation due to ohmic resistance will be avoided.

Starting the vehicle using the internal combustion engine, which is done particularly when the electric energy store is almost empty, is preferably accomplished by engaging the clutch of the lowest gear of the second input shaft after starting the internal combustion engine during forward starting, and when starting in reverse, by engaging the clutch of the reversing stage of the second input shaft, and after that, by engaging the decoupler, and that after that, by decelerating the electric motor in generator operation while at the same time increasing the torque of the internal combustion engine and the regenerative torque of the electric motor until the electric motor comes to a standstill.

After that, the electric motor is appropriately accelerated further, during engine operation, until synchronous operation of the clutch of the next higher gear of the first input shaft is achieved, the clutch concerned then being engaged. The electric motor then is shifted without power, and the gear of the lowest gear of the second input shaft is disengaged.

When the internal combustion engine is in operation, a gear change from a gear under load of the first input shaft to a target gear of the second input shaft takes place in such a way that initially, the countershaft of the target gear is accelerated, using the electric motor, until the clutch of the target gear reaches the synchronous rotational speed. Then the clutch of the target gear is engaged, and that after that, the supporting torque of the electric machine is increased until the clutch of the gear under load can be disengaged without power.

In contrast, a corresponding change of gear from a gear under load of the second input shaft to a target gear of the first input shaft takes place in such a way that initially, the countershaft of the target gear is decelerated until the synchronous rotational speed of the clutch of the target gear during upshifting is reached by increasing the torque support of the electric motor, and then the countershaft of the target gear is accelerated by reducing the torque support of the electric motor, and then the clutch of the target gear is engaged, and then the electric motor is shifted without power and the clutch of the gear under load is disengaged.

BRIEF DESCRIPTION OF THE DRAWINGS

For the purpose of clarifying the invention, drawings with embodiments are added to the description, wherein.

DETAILED DESCRIPTION OF THE PREFERRED EMBODIMENTS

Figure 1:
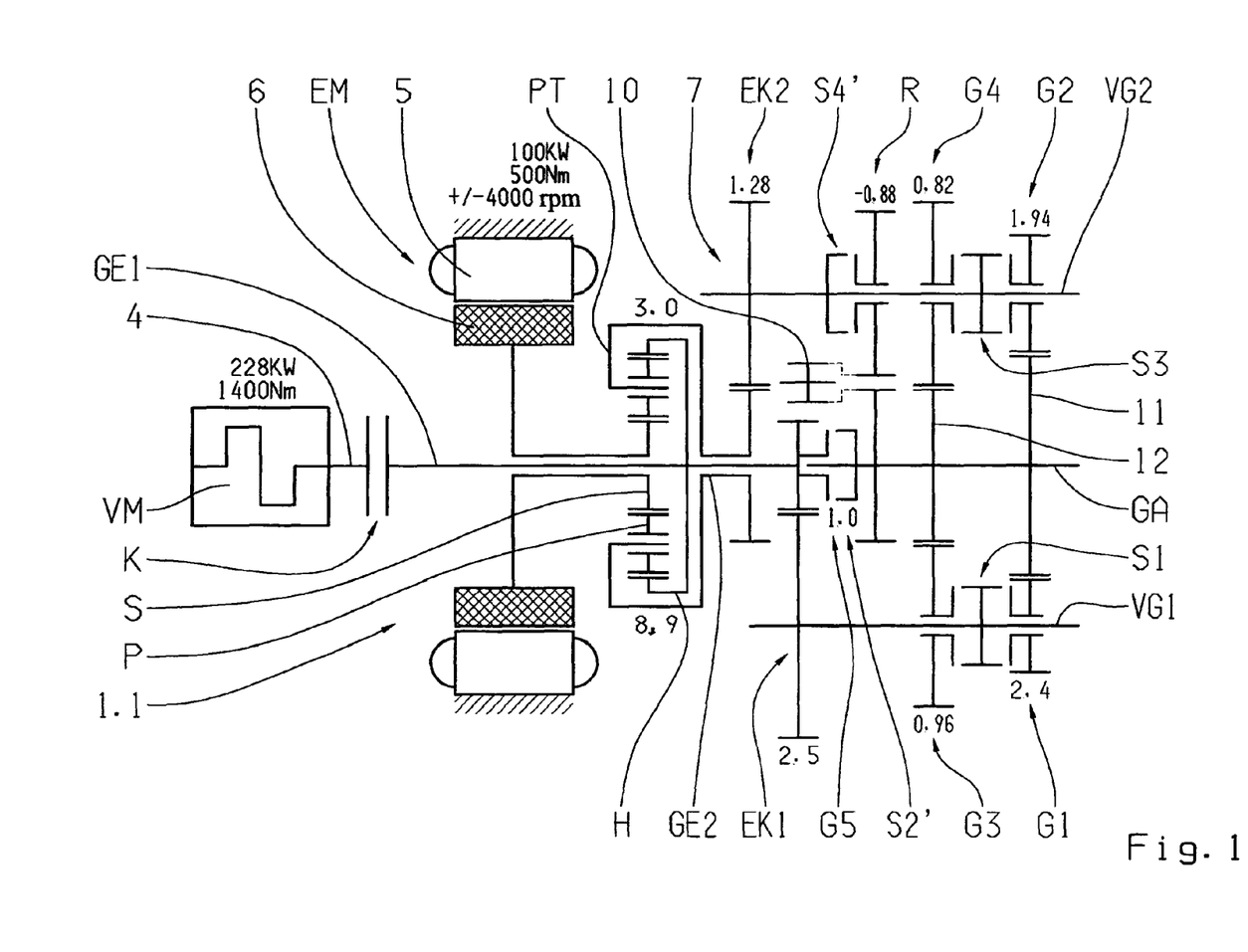
FIG. 1 is a schematic presentation of a first embodiment of a hybrid train of the invention.

In FIG. 1, a first embodiment of the hybrid train of the invention 1.1 is shown in schematic form. This hybrid drive train 1.1 comprises an internal combustion engine VM with a driveshaft 4, an electric motor EM that can be operated as a motor and a generator, with a stator 5 and a rotor 6, a multistep transmission 7 with two input shafts GE1, GE2, and an output shaft GA, and a differential transmission with three drive elements.

The first input shaft GE1 of the transmission 7 can be connected to the driveshaft 4 of the internal combustion engine VM by means of an assigned decoupler K. The differential transmission 8 is designed as a simple planetary gearset 9 with a sun gear S, a planet carrier PT, and a ring gear H, whereby the planet carrier PT carries a plurality of rotateable planetary gears P, each of which is in interlocking engagement with the sun gear S and the ring gear H. The planetary gearset 9 is arranged coaxially about the first input shaft GE1. The ring gear H is rotationally fixed to the first input shaft GE 1 of the transmission 7, the planet carrier PT is rotationally fixed to the second input shaft GE2 of the gearshift 7, and the sun gear S is rotationally fixed with the rotor 6 of the electric motor EM.

The transmission 7 is designed as a countershaft transmission with a coaxially stacked arrangement of the two countershafts GE1 and GE2, with an arrangement of the output shaft GA arranged coaxially adjacent to that, and with two countershafts VG1, VG2 which, in each case, have a drive connection with one of the two input shafts VG1, VG2 by means of an input constant EK1 or EK2, whereby the two input constants EK1, EK2 are comprised, in each case, of a gearwheel pair, each having a ratio greater than one ($i_{EK1} > 1.0$; $i_{EK2} > 1.0$). The second input shaft GE2 is designed as a ring shaft and is arranged coaxially about the centrally arranged first input shaft GE1.

The transmission 7 has five forward gears G1 to G5 and a reversing stage R. The odd gears G1, G3, G5 are assigned to the first input shaft GE1, in that in each case a gearwheel set of the first gear G1 and the third gear G3, which are in each case comprised of an idler gear and a stationary gear, are arranged on the first countershaft VG1 or on the output shaft GA. The stationary gears of the first gear G1 and the third gear G3 are arranged rotationally fixed on the output shaft GA. The idler wheels of the first gear G1 and the third gear G3 are rotatably mounted on the first countershaft VG1 and can be selectively connected by means of assigned clutches that are combined in a common shift pack S1 to the first countershaft VG1. The fifth gear is configured as a direct gear and can be engaged and disengaged by means of a clutch S2' that is arranged between the first input shaft GE1 and the output shaft GA.

The even gears G2 and G4, and the reversing stage R are assigned to the second input shaft GE2 in that, in each case, one gearwheel set of the second gear G2, the fourth gear G4, and the reversing stage, which in each case include one idler gear and one stationary gear, are arranged on the second countershaft VG2, or the output shaft GA. The gearwheel set of the reversing stage R also has an additional intermediate wheel 10 for reversing the rotational direction. The stationary wheels of the second gear G2, the fourth gear G4, and the reversing stage R are arranged rotationally fixed on the output shaft GA. The idler wheels of the second gear G2, the fourth gear G4, and the reversing stage R are rotationally arranged on the second countershaft VG2 and can be selectively connected by means of assigned clutches of the second countershaft VG2. The clutches of the second gear G2 and the fourth gear G4 are combined in a common shift pack S3, whereas in contrast, the clutch S4' of the reversing stage is separately arranged. The gearwheel sets of the first gear G1 and the second gear G2, as well as the gear sets of the third gear G3 and the fourth gear G4, are each arranged in the same axial position and have a common stationary wheel 11, 12.

By means of the design and arrangement of the electric motor EM, the differential transmission 8, and the transmission 7, the hybrid drive train 1.1 has varied control possibilities with compact dimensions. For driving operation with the internal combustion engine, two transmission branches are available for transmitting a torque from the internal combustion engine VM to the output shaft GA. The first transmission branch runs from the decoupler K through the first input shaft GE1, the assigned input constant K, and the gearwheel set of the engaged gear G1, or G3, to the output shaft GA, and with the fifth gear G5 engaged, directly from the first input shaft GE1 to the output shaft GA.

The second transmission branch runs from the decoupler K through the first input shaft GE1, the ring gear H, the planetary gears P, and the planet carrier PT of the planetary gearset 9, the second input shaft GF2, the assigned input constant EK2 and the gearwheel set of the engaged gear G2, or G4, or the reversing stage R, to the output shaft GA, whereby the torque that is transmitted by the planetary gearset must be supported by a corresponding torque, which is produced by the electric motor EM, by means of the sun gear S of the planetary gearset.

During transmission of a torque via the first transmission branch, with an engaged gear of the second transmission branch, the electric motor EM can, if required, be operated as a generator for charging an electric energy storage or as a motor for supporting the internal combustion engine VM. During upshifting and downshifting, there is shifting between the two transmission branches, whereby the synchronization of the target gear that is to be engaged and the load transfer from the transmission branch with the disengaged gear under load to the transmission branch with the target gear that is to be engaged, is controlled by means of the electric motor EM. In this way, the shifting operations take place without interruption of traction. Due to the outside synchronization by means of the electric motor EM, the clutches of the gearwheel sets can be designed as unsynchronized claw couplings which save cost and installation space compared to other clutches.

During electric-motor drive operation, power is transmitted from the electric motor EM in two transmission branches that are parallel to one another. The first transmission branch runs from the sun gear S, via the planet gears P and the ring gear H of the planetary gearset 9, and, onward via the first input shaft GE1 to the assigned input constant EK1, and the gearwheel set of the engaged gear G1 or G3 to the output shaft GA; with the engaged gear G5, directly from the first input shaft GE1 to the output shaft GA. The second transmission branch runs from the sun gear S, via the planetary gears P and the planet carrier PT of the planetary gearset 9, onward via the second input shaft GE2, the assigned input constant EK2, and the gearwheel set of the engaged gear G2, or G4, of the reversing stage R to the output shaft GA.

Electric-motor operation is provided as the preferred option for starting the vehicle, whereby the selection of the gears engaged in the two transmission branches is determined, in each case, by the charging state, a load condition, and inclination of the roadway. By assigning the lowest forward gear G1 to the first transmission branch and the reversing stage R to the second transmission branch, a particularly high ratio, between the electric motor EM and the output shaft GA, is obtained from engaging the gears G1, R, whereby the flow of force, in both transmission branches, runs from the electric motor EM, or the sun gear S of the planetary gearset 9, to the output shaft GA. In this way, there is not any idle power that degrades the degree of transmission efficiency.

In FIG. 1, using the corresponding assembly of the hybrid drive train 1.1, output data and rotational speed ranges of the internal combustion engine VM and the electric motor EM, typical of a city bus, are specified as well as ratio values of the planetary gearset 9, the two input constants EK1 and EK2, and the gearwheel sets. Thus, the internal combustion engine VM can have an output of 228 kW and a maximum torque of 1400 Nm. The electric motor is constructed in such a way that it has an output of 100 kW and a maximum torque of 500 Nm and it can be operated within a rotational speed range of +/−4000 revolutions per minute. The stationary gear ratio of the planetary gearset is 3.0, and the ratio values of the transmission gears are: 2.4 in the $1^{st}$ gear, 1.94 in the $2^{nd}$ gear, 0.96 in the $3^{rd}$ gear, 0.82 in the $4^{th}$ gear, 1.0 in the $5^{th}$ gear, −0.88 in the reverse, with 2.5 as the input constant EK1, and 1.28 as the input constant EK2.

Figure 2:
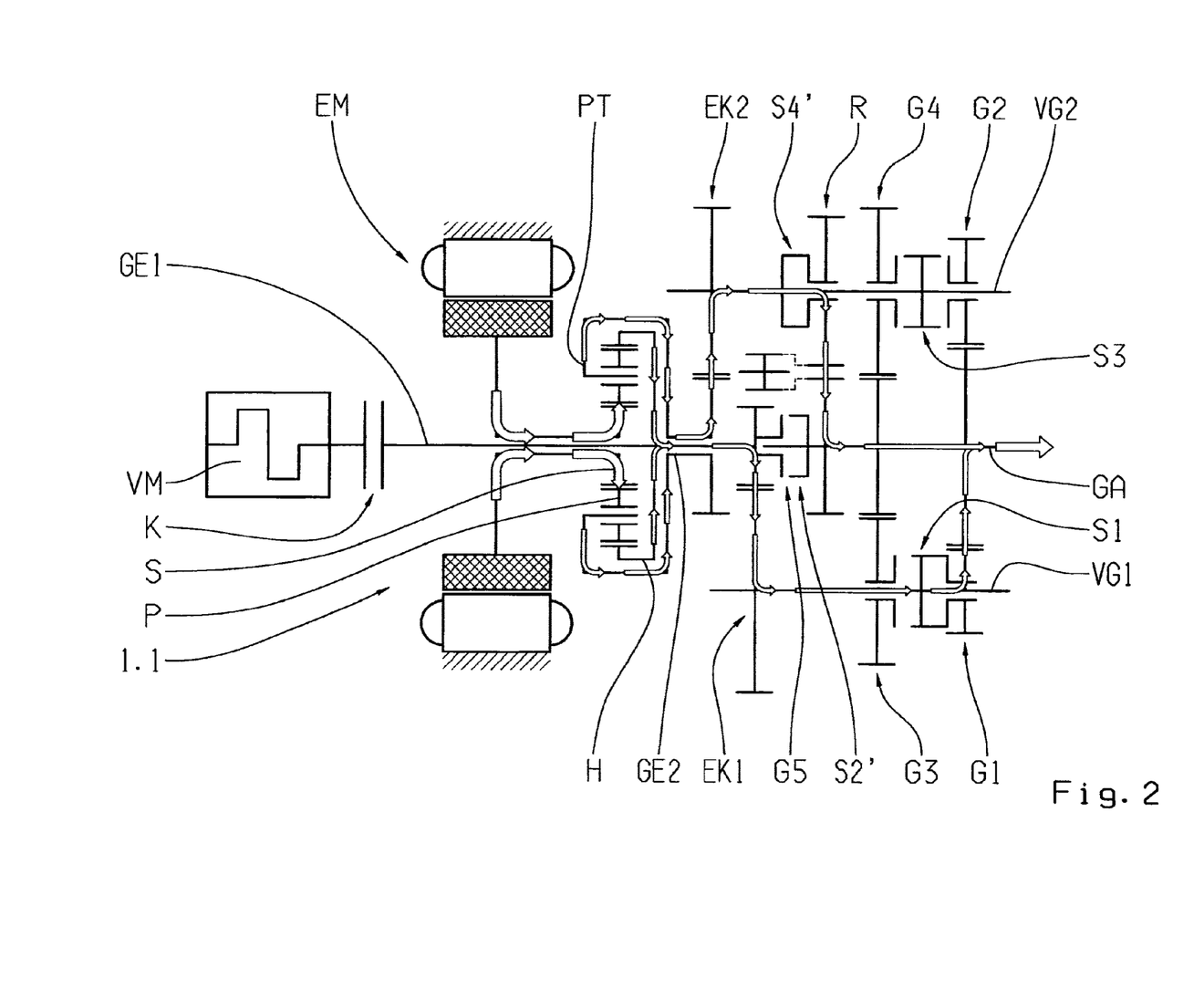
FIG. 2 is the flow of force in the hybrid drive train according to FIG. 1 with an electric motor starting operation.

In FIG. 2, in the hybrid gear train 1.1 according to FIG. 1, the flow of force from the electric motor EM to the output shaft GA for an electric-motor starting operation is shown with arrows. In order to achieve a high overall gear ratio, the clutches of first gear G1 that is assigned to the first input shaft GE1 and the clutches of the reversing stage R, which is assigned to the second input shaft GE2, are engaged. Using the ratio values of FIG. 1 produces the effective overall gear ratio:

$$n_{EM}/n_{GA}=(1+i_{St})*i_{EK2}*i_R-i_{St}*i_{EK1}*i_{G1}=-22.5,$$

in which $n_{EM}$ stands for the rotational speed of the rotor of the electric motor EM, $n_{GA}$ for the rotational speed of the transmission output shaft GA, $i_{St}$ the term for the stationary ratio of the gearshift; $i_{EK1}$, or $i_{EK2}$ for the ratio of the input constant EK1, or EK2M; $i_R$ for the ratio of the reversing stage; and $i_{G1}$ for the value of the ratio of the gearwheel set of the first gear G1.

The minus sign means that the rotational direction of the rotor 6 of the electric motor EM and that of the output shaft GA of the gearshift 7 are opposite. This means that the electric motor EM, in relation to the rotational direction of the driveshaft 4 of the internal combustion engine VM, must be accelerated in reverse during forward drive and accelerated forward when driving in reverse.

Figure 3:
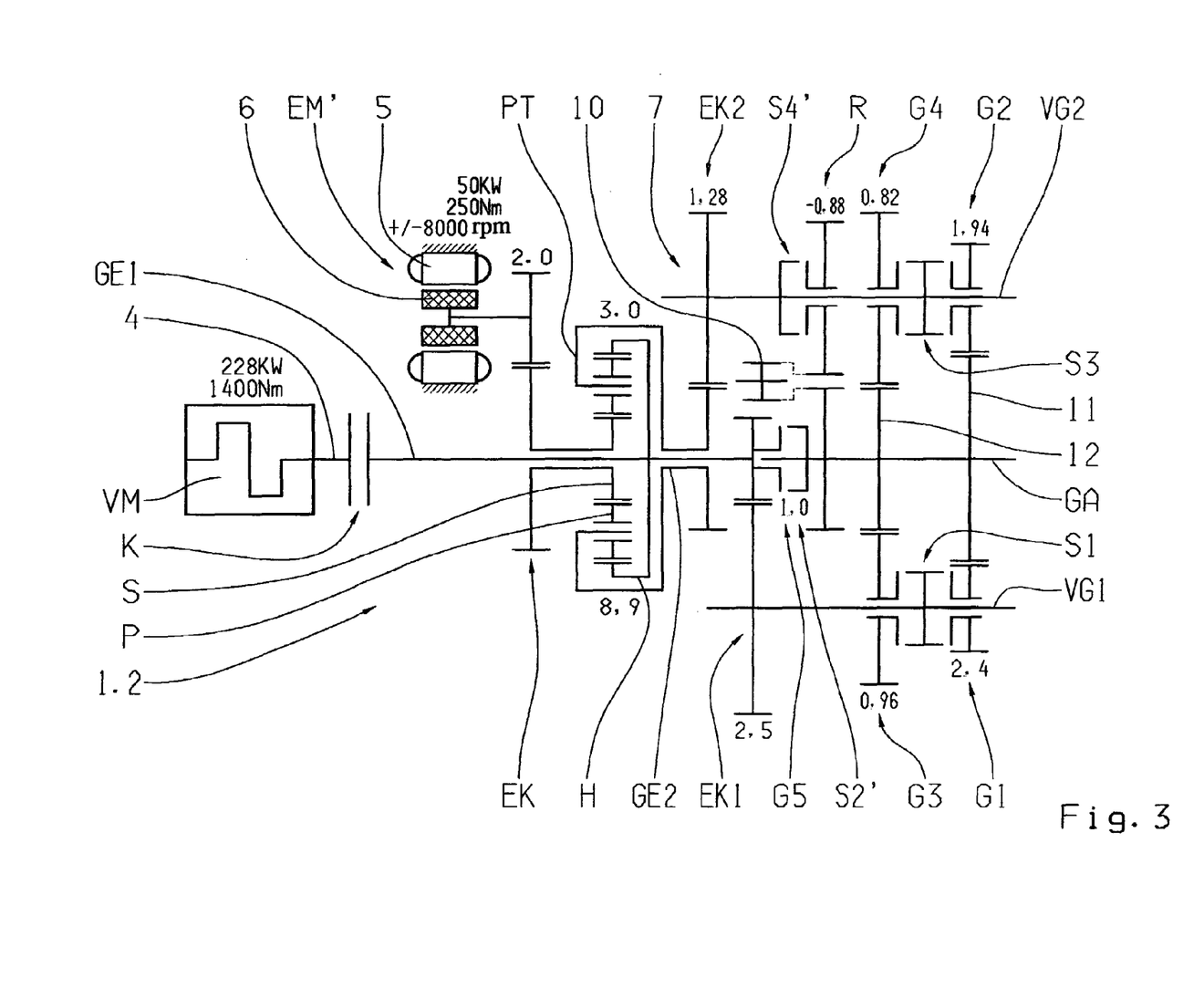
FIG. 3 is a first further development of the hybrid drive train according to FIG. 1.

In the embodiment of hybrid drive train 1.2 according to FIG. 3, the electric motor EM', in contrast to the embodiment according to FIG. 1, is arranged axially parallel adjacent to the first input shaft GE1, and the rotor 6 of the electric motor EM' is in drive connection with the sun gear S of the planetary gearset 9 by means of an input constant EK with the ratio $i_{EK}=2.0$ that is formed by a pair of gearwheels. In this way, the electric motor EM', with simultaneous doubling of the rotational-speed range, can be designed to produce half as much torque and be correspondingly smaller, lighter and more cost-efficient.

Figure 4:
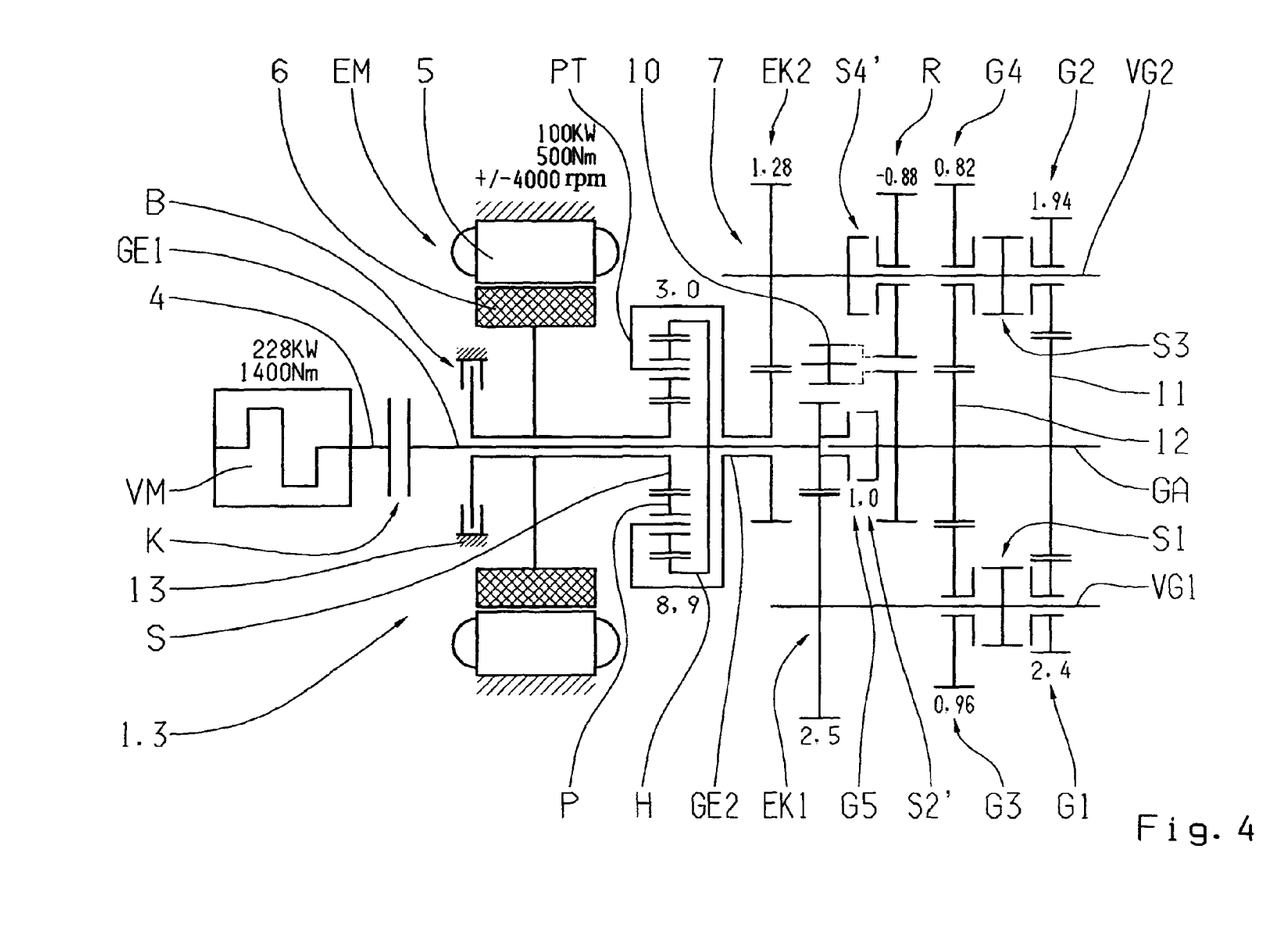
FIG. 4 is a second further development of the hybrid drive train according to FIG. 1.

In the embodiment of the hybrid drive train 1.3 according to FIG. 4, in contrast to the variation according to FIG. 1, a brake B is also provided which is arranged between a component that is fixed to the housing, between the sun gear S of the planetary gearset 9 or the rotor 6 of the electric motor EM, and a component 13 that is fixed to the housing. The brake B is preferably engaged during internal-combustion engine drive operation with a stationary torque transfer, via the second transmission branch, which causes mechanical arrest of the sun gear S. In that way, the electromagnetic support of the transmitted torque to the sun gear S by means of the electric motor EM and the electric power loss can be avoided.

Figure 5:
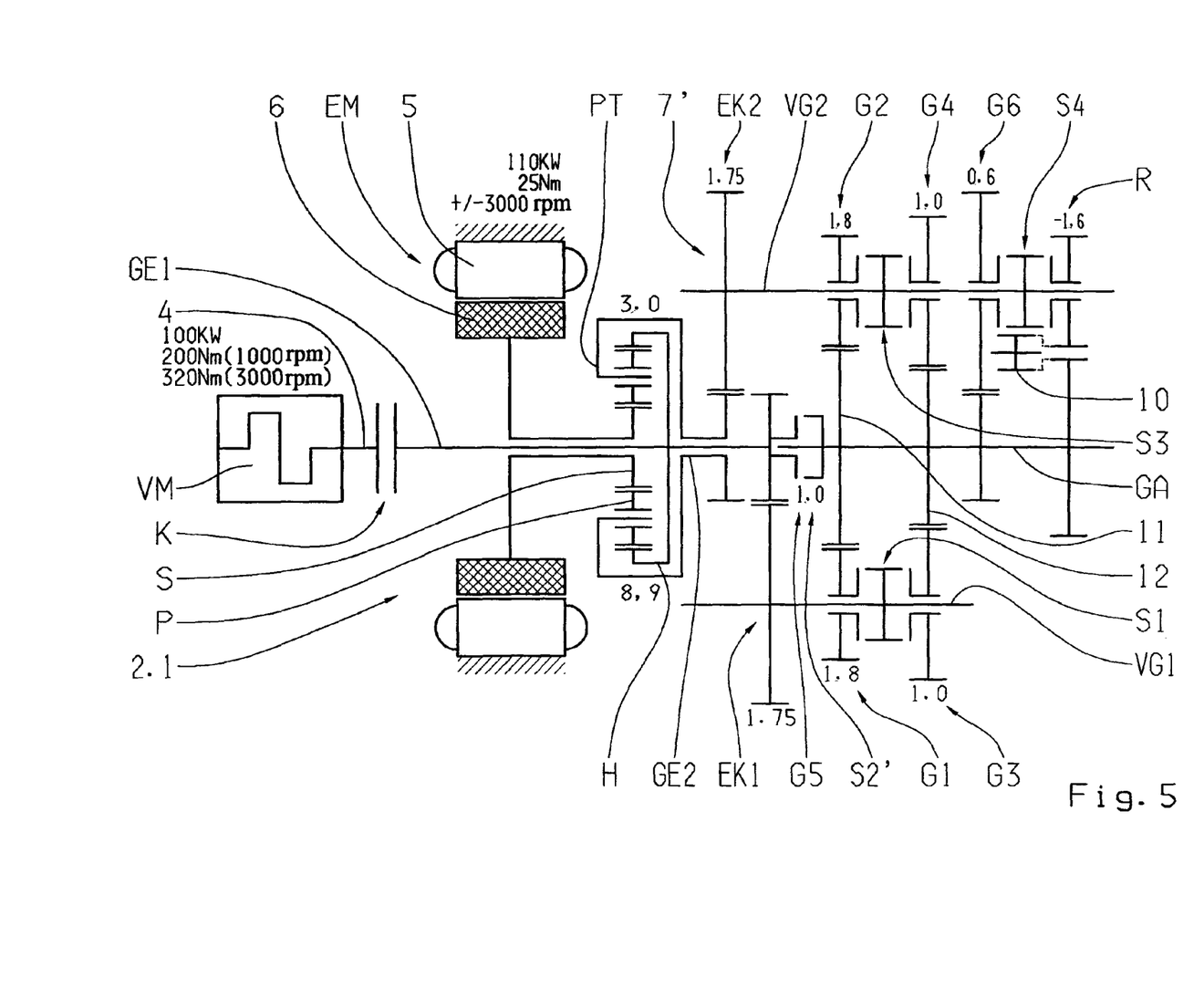
FIG. 5 is a second embodiment of the hybrid train of the invention in a schematic presentation.

A second construction variant of the hybrid train of the invention 2.1 is presented in schematic form in FIG. 5. In contrast to the first embodiment according to FIG. 1, the arrangement of the gearwheel sets in the transmission 7' is axially reversed. In addition, an additional gearwheel set of a sixth gear G6 is provided, which is arranged between the second countershaft VG2 and the output shaft GA, axially between the gearwheel sets of the fourth gear G4 and the reversing stage R. The stationary gear of the sixth gear G6 is rotationally fixed with the output shaft GA. The idler gear of the sixth gear G6 is rotationally arranged on the second countershaft VG2 and can be connected, by means of an assigned clutch, to the second countershaft VG2. The clutch of the sixth gear G6 is combined with the clutch of the reversing stage R in a common shift pack S4.

In FIG. 5, using the corresponding assembly groups of the hybrid drive train 2.1, output data for the internal combustion engine VM and the electric motor EM, typical of a medium-class passenger car, are provided as well as the ratio values of the planetary gear set 9, the input constants EK1, EK2, and the gearwheel sets. Thus, the internal combustion engine VM can have an output of 100 kW and a maximum torque of 200 Nm at 1000 revolutions per minute, or 320 Nm at 3000 revolutions per minute. The electric motor EM is constructed in such a way that it has an output of 110 kW and a maximum torque of 25 Nm so that it can be operated within a rotational speed range of +/−3000 revolutions per minute. The stationary gear ratio of the planetary gearset is 3.0 and the ratio values of the transmission gears are: 1.8 in the $1^{st}$ gear, 1.8 in the $2^{nd}$ gear, 1.00 in the $3^{rd}$ gear, 1.00 in the $4^{th}$ gear, 1.0 in the $5^{th}$ gear, 0.6 in the sixth gear, −1.6 in the reversing stage, with 1.75 as the input constant EK1, and 1.75 as the input constant EK2.

Figure 6:
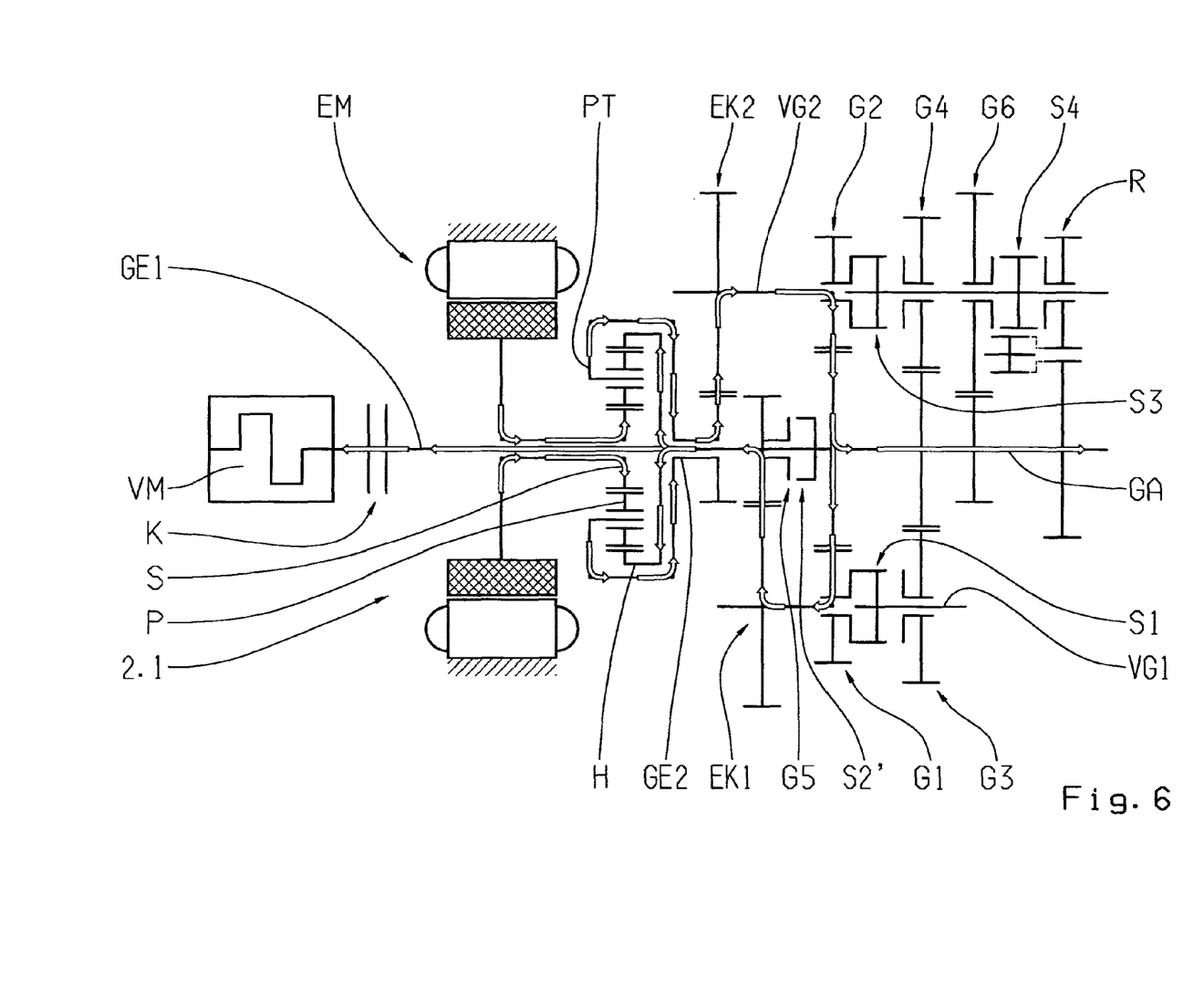
FIG. 6 is the flow of force in the hybrid drive train according to FIG. 5 with an impulse-start of the internal combustion engine.

In FIG. 6, in the hybrid gear train 2.1 according to FIG. 2, for an impulse start of the internal combustion engine VM during an electric-motor starting operation, the flow of force from the electric motor EM to the output shaft GA and to the first input shaft GE1, or to the decoupler K, is shown with arrows. In this way, a significant flow of force passes via the planetary gears P and the planetary carrier PT of the planetary gearset 9, the second input shaft GE2, the second input constant EK2, the second countershaft VG2, and the gearwheel set of the engaged second gear G2 to the output shaft GA. The largest part of this torque is conveyed via the gearwheel set of the engaged first gear G1, the second countershaft VG1, and the first input constant EK1 to the first input shaft GE1 and split there into a partial torque required for the torque equilibrium of the planetary gearset 9 in the ring gear H of the planetary gear set, as well as into a partial torque that is transmitted via the decoupler K for the impulse-start of the internal combustion engine VM. In the case of a greater torque, such as that required for the impulse-start of the internal combustion engine VM, a greater share of the torque can be drawn, during deceleration of the motor vehicle by means of the output shaft GA, from the resulting torque of inertia of the motor-vehicle weight, as well as from the rotating masses of the drive train, and transferred, via the back-coupling branch, into the first input shaft GE1.

Figure 7:
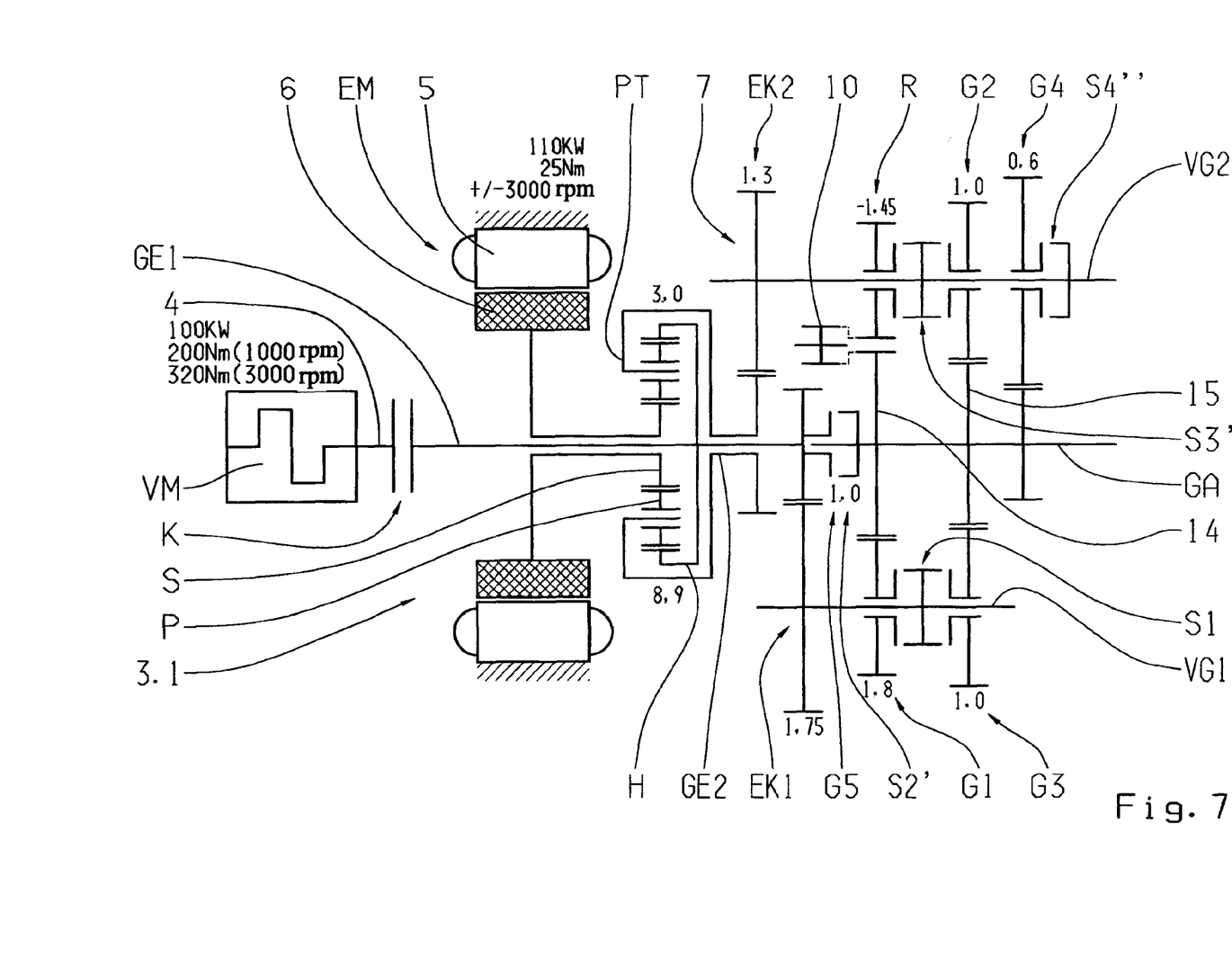
FIG. 7 is a third embodiment of the hybrid train of the invention in a schematic presentation.

A third embodiment of the hybrid train of the invention 3.1 is shown in schematic form in FIG. 7. The geometric construction of this variation largely corresponds to that of the first embodiment according to FIG. 1. In contrast, however, in this case the gearwheel sets of the forward gears G1, G3, and G2, G4 are, in each case, arranged in an axially inverted manner; the clutches of the second gear G2 and the reversing stage R are combined in a common shift pack S3', and the clutch S4" of the fourth gear G4 is arranged separately. In addition, the gearwheel sets of the first gear G1 and the reversing stage R, as well as the gearwheel sets of the second gear G2 and the third gear G3 are each arranged in the same axial position and have, in each case, a common stationary gear 14 or 15.

However, the output data for the corresponding assembly groups of the hybrid drive train 3.1 of the internal combustion engine VM and the electric motor EM, as well as the ratio values of the planetary gearset 9, the input constants EK1, EK2, and the gearwheel sets correspond, as in FIG. 5, to those of a medium-class passenger car. Thus, the internal combustion engine VM can have an output of 100 kW and a maximum torque of 200 Nm at 1000 revolutions per minute, or 320 $N_{mat}$ 3000 revolutions per minute. The electric machine NM is constructed in such a way that it has an output of 110 kW and a maximum torque of 25 Nm, and can be operated in a rotational-speed range of +/−3000 revolutions per minute. The stationary ratio of the planetary gearing amounts to 3.0 and the ratio values of the gears are as follows: 1.8 in the $1^{st}$ gear, 1.0 in the $2^{nd}$ gear, 1.0 in the $3^{rd}$ gear, 0.6 in the $4^{th}$ gear, 1.0 in the $5^{th}$ gear, −1.45 in the reversing stage R, with 1.75 as the input constant EK1, and 1.3 as the input constant EK2.

Figure 8:
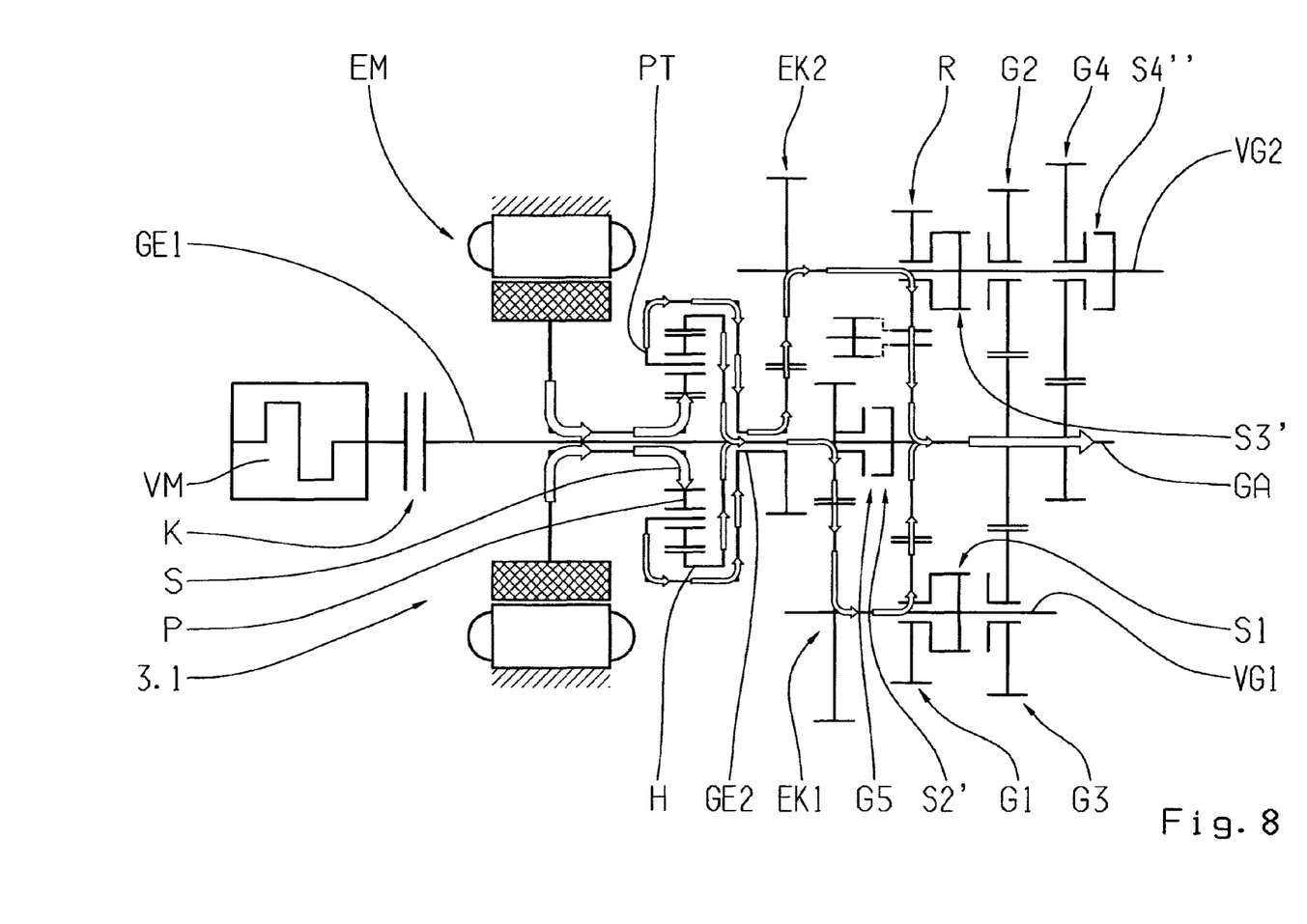
FIG. 8 is the flow of force in the hybrid drive train according to FIG. 7 with an electric-motor starting operation.

In FIG. 8, in the hybrid drive train 3.1 according to FIG. 7, for an electric-motor starting operation, the flow of force from the electric motor EM to the output shaft GA is shown with arrows. In order to achieve a higher overall ratio, in a manner analogous to FIG. 2, the clutches of the first gear G1 assigned to the first input shaft GE1 are engaged, as are those of the reversing stage R, which are assigned to the second input shaft GE2. Using the ratio values in FIG. 7 produces the effective overall gear ratio:

$$n_{EM}/n_{GA}=(1+i_{St})*i_{EK2}*i_R-i_{St}*i_{EK1}*i_{G*}=-17.0,$$

whereby the electric motor EM, in relation to the rotational direction of the driveshaft 4 of the internal combustion engine VM, rotates in reverse with forward starting, and in a forward direction with reverse starting.

Figure 9:
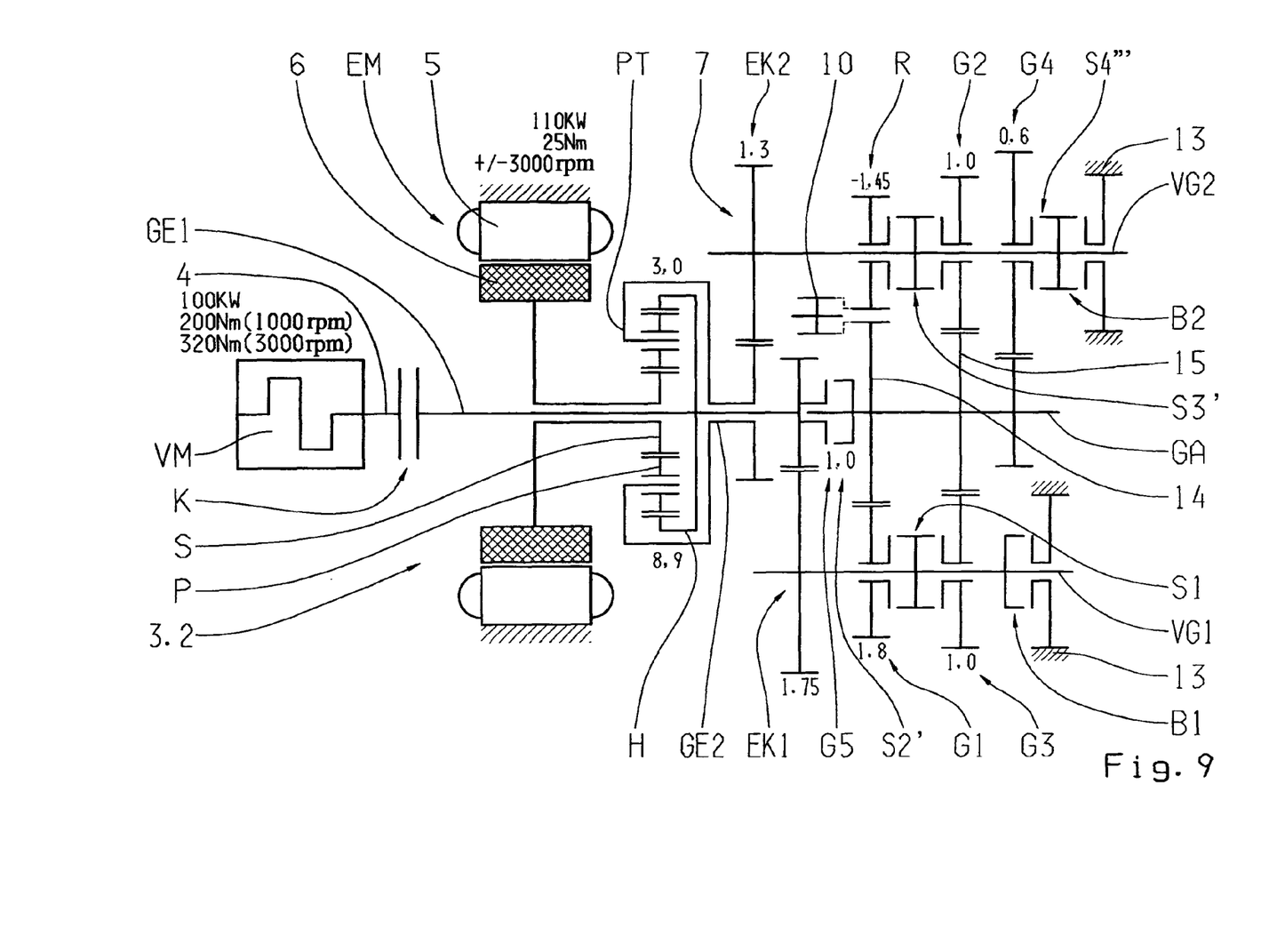
FIG. 9 is a further development of the hybrid drive train according to FIG. 7.

In the embodiment of the hybrid drive train 3.2 according to FIG. 9, in contrast to the variation according to FIG. 7, a brake B1, B2 is arranged, in each case, on each of the two countershafts VG1, VG2 by means of which the countershaft concerned VG1, VG2 can, in each case, be stopped in relation to a component 13 that is fixed to the housing. The brakes B1, B2 are structurally identical to the gear clutches of the gears G1 to G6 and the reversing stage R in terms of structure and arrangement, and in terms of control technology are incorporated into the actuation of the gear clutches. The second brake B2 is arranged on the second countershaft VG2 and is combined, in a common shift pack S4''', with the gear clutch of the fourth gear G4, whereas the brake B1 is arranged separately on the first countershaft VG1. The two brakes B1, B2 are preferably alternately engaged, in electric-motor driving operation, in order to support a rotational torque that is transmitted, in each case, via the other input shaft GE1, GE2, or by the countershaft VG1, VG2, which leads, in each case, to either the ring gear H or the planet carrier PT of the planetary gearset 9 being mechanically stopped. In this way, energy is conserved in the planetary gearset 9 for reciprocal support and the associated idle power is avoided.

REFERENCE SIGNS 1.1 Hybrid drive train
1.2 Hybrid drive train
1.3 Hybrid drive train
2.1 Hybrid drive train
3.1 Hybrid drive train
3.2 Hybrid drive train
4 Driveshaft
5 Stator
6 Rotor
7 Transmission
7' Transmission
8 Differential transmission
9 Planetary gearset
10 Intermediate gearwheel
11 Fixed gear
12 Fixed gear
13 Component fixed to the housing
14 Fixed gear
15 Fixed gear
B Brake of EM
B1 First brake of VG1
B2 Second brake of VG2
EK Input constant of EM
EK1 First input constant of stator, VG1
EK2 Second input constant of stator, VG2
EM Electric motor
EM' Electric motor
G1-G6 (forward) gear
GA Output shaft of stator
GE1 First input shaft of stator, VG1
GE2 Second input shaft of stator, VG2
H Ring gear of gearset
i Ratio
$i_{EK}$ Ratio of EK
$i_{EK1}$ Ratio of EK1
$i_{EK2}$ Ratio of EK2
$i_{G1*}$ Ratio of the gearwheel set of GE1
$i_{G2*}$ Ratio of the gearwheel set of GE2
$i_{G1}$ Ratio of the gearwheel set of G1
$i_{G2}$ Ratio of the gearwheel set of GE2
$i_{G3}$ Ratio of the gearwheel set of GE3
$i_{G4}$ Ratio of the gearwheel set of GE4
$i_{G5}$ Ratio of G5
$i_{G6}$ Ratio of the gearwheel set of G6
$i_R$ Ratio of the gearwheel set of R
$i_{St}$ Stationary ratio of the gearset
K Decoupler
$M_{EM}$ Torque of EM
$M_{EM\_max}$ Maximum torque of EM
$M_{VM}$ Torque of VM
$M_{VM\_max}$ Maximum torque of VM
n Rotational speed
$n_{EM}$ Rotational speed of EM
$n_{GA}$ Rotational speed of GA
$n_H$ Rotational speed of H
$n_{PT}$ Rotational speed of PT
$n_S$ Rotational speed of S
P Planetary gear of gearset
PT Planetary carrier of gearset
R Reversing stage
S Sun gear of gearset
S1 Shift pack
S2' Gear clutch
S3 Shift pack
S3' Shift pack
S4 Shift pack
S4' Gear clutch
S4'' Gear clutch
S4''' Shift pack
VG1 First countershaft of stator
VG2 Second countershaft of stator
VM Internal combustion engine

The invention claimed is:

1. A hybrid drive train of a motor vehicle comprising:
an internal combustion engine (VM) with a driveshaft (4),
an electric motor (EM) with a rotor (6) that is operable as an engine and as a generator, a multi-stage transmission (7) with first and second input shafts (GE1, GE2) and an output shaft (GA), a differential transmission (8) in which at least one of the first and the second input shafts (GE1, GE2) is connected to the driveshaft (4) by an assigned decoupler (K), and both the first and the second input shafts (GE1, GE2) being selectively connected by alternately assigned gearwheel sets of different ratios and in each case one assigned gear clutch to the output shaft (GA), the differential transmission (8) being a simple planetary gearset (9) is arranged coaxially about the first input shaft (GE1), a ring gear (H) being connected, in a rotationally fixed manner, to the first input shaft (GE1), a planet carrier (PT) being connected in a rotationally fixed manner to the second input shaft (GE2), and a sun gear (S) of the planetary gearset having a drive connection with the rotor (6), only the first input shaft (GE1) which is connected, in a rotationally fixed manner, with the ring gear (H) which is connectable, by a decoupler (K), to the driveshaft (4), and the multi-stage transmission (7) being a countershaft transmission with a coaxially adjacent arrangement of the output shaft (GA), and first and second countershafts (VG1, VG2) which have, in each case, a drive connection with one of the first and the second input shafts (GE1, GE2) by an input constant (EK1, EK2), the gearwheel sets of which are respectively arranged alternately on the first countershaft (VG1) and on the output shaft (GA), and the second countershaft (VG2) and the output shaft (GA).

2. The hybrid drive train according to claim 1, wherein the electric motor (EM) is coaxial with the first input shaft (GE1), and the rotor (6) of the electric motor (EM) is connected in a rotationally fixed manner with the sun gear (S) of the planetary gearset (9).

3. The hybrid drive train according to claim 2, wherein the electric motor (EM) has a maximum torque ($M_{EM\_max}$), which corresponds at least to a part of maximum torque ($M_{VM\_max}$) of the internal combustion engine (VM) that is produced with a stationary gear ratio ($i_{St}$) of the planetary gearset ($M_{EM\_max} >= 1/i_{St} * M_{VM\_max}$).

4. The hybrid drive train according to claim 1, wherein the electric motor (EM') is arranged axially parallel to the first input shaft (GE1), and the rotor (6) of the electric motor (EM') has a drive connection to the sun gear (S) of the planetary gearset (9) via an input constant (EK) with a ratio ($i_{EK}$) greater than 1 ($i_{EK} > 1.0$).

5. The hybrid drive train according to claim 4, wherein the electric motor (EM') has a maximum torque ($M_{EM\_max}$), which corresponds to at least part of a maximum torque ($M_{VM\_max}$) of the internal combustion engine (VM) that is formed by a product of the ratio ($i_{EK}$) of the input constants (EK) of the electric motor (EM) and the stationary gear ratio ($i_{St}$) of the planetary gearset ($M_{EM\_max} >= M_{St} * i_{St}) * M_{VM\_max}$).

6. The hybrid drive train according to claim 1, wherein a controllable brake clutch (B) is arranged between the sun gear (S) of the planetary gearset (9) of the rotor (6) of the electric motor (EM) and a component (13) that is fixed to a housing for providing stationary support for a transmitted torque.

7. The hybrid drive train according to claim 1, wherein the gearwheel sets for odd gears (G1, G3, G5) are arranged on the first countershaft (VG1) and on the output shaft (GA), and gearwheel sets of even gears (G2, G4) and a reversing stage (R) are arranged on the second countershaft (VG2) and on the output shaft (GA).

8. The hybrid drive train according to claim 1, wherein the input constants (EK1, EK2) of the first and the second countershafts (VG1, VG2) each have ratios ($i_{EK1}$, $i_{EK2}$) that is greater than one ($i_{EK1} > 1.0$; $i_{EK2} > 1.0$).

9. The hybrid drive train according to claim 1, wherein each of the gearwheel sets comprises a fixed wheel that is connected in a rotationally fixed manner with the output shaft (GA) and an idler wheel that is rotationally arranged on the associated countershaft (VG1, VG2), and the idler wheels are connected by an assigned gear clutch to the associated countershaft (VG1, VG2), and the gear clutches are combined in pairs in common shift packs (S1, S3, S3', S4).

10. The hybrid drive train according to claim 1, wherein at least one gearwheel set arranged on the first countershaft (VG1) and on the output shaft (GA), as well as one gearwheel set arranged on the second countershaft (VG2) and on the output shaft (GA) are arranged in a same axial position, and have a common stationary wheel (11, 1, 14).

11. The hybrid drive train according to claim 1, wherein one direct gear clutch (S2') is arranged between one of the first and the second input shafts (GE1, GE2) and the output shaft (GA).

12. The hybrid drive train according to claim 1, wherein, a controllable brake clutch (B1 or B2) is provided on each of the first and the second countershafts (VG1, VG2) for connecting to a component (13) that is fixed to the housing for supporting a torque that is transmitted, in each case, by the other of the first or the second input shaft (GE1, GE2).

13. The hybrid drive train according to claim 12, wherein the brake clutches (B1, B2), are constructed in a same manner as gear clutches and are incorporated in terms of control-technology into actuation of the gear clutches, in terms of construction and arrangement.

14. A method of controlling a hybrid drive train of a motor vehicle which comprises an internal combustion engine (VM) with a driveshaft (4), an electric motor (EM) with a rotor (6) that is operable as an engine and as a generator, a multi-stage transmission (7) with first and second input shafts (GE1, GE2) and an output shaft (GA), a differential transmission (8), in which at least one of the first and the second input shafts (GE1, GE2) is connected to the driveshaft (4) by an assigned decoupler (K), both of the first and the second input shafts (GE1, GE2) is connected selectively by alternately assigned gearwheel sets of different ratios and in each case one assigned gear clutch to the output shaft (GA), and in which the differential transmission (8) is a simple planetary gearset (9) that is arranged coaxially about the first input shaft (GE1), a ring gear (H) of which is connected in a rotationally fixed manner to the first input shaft (GE1), a planet carrier (PT) of which is connected in a rotationally fixed manner to the second input shaft (GE2), and a sun gear (S) of this planetary gearset has a drive connection with the rotor (6), only the first input shaft (GE1), which is connected in a rotationally fixed manner with the ring gear (H) is connectable to the driveshaft (4) by means of a decoupler (K), and the multi-stage transmission (7) is a countershaft transmission with a coaxially adjacent arrangement of the output shaft (GA), and first and second countershafts (VG1, VG2) which have, in each case, a drive connection with one of the first and the second input shafts (GE1, GE2) by an input constant (EK1, EK2), the gearwheel sets of which are respectively arranged alternately on the first countershaft (VG1) and on the output shaft (GA), the second countershaft (VG2) and the output shaft (GA), the method comprising the steps of:

disengaging the decoupler (K),
engaging a gear clutch of a gear assigned to the first input shaft (GE1) and a gear clutch of a gear assigned to the second input shaft (GE2), and
then accelerating the rotor (6) of the electric motor (EM) during motor operation to start driving with the electric motor.

15. The method according to claim 14, further comprising the step of selecting two gears to be engaged depending on the load when starting.

16. The method according to claim 15, further comprising the step of engaging the gear clutch of the lowest gear (G1) of the first input shaft (GE1) and the gear clutch of the reversing stage (R) of the second input shaft (GE2) when the motor vehicle has a high load at the point of starting, and
accelerating the rotor (6) of the electric motor (EM) in relation to a direction of rotation of the driveshaft (4) of the internal combustion engine (VM) in reverse when starting in a forward direction, and accelerated forward when starting in reverse.

17. The method according to claim 14, further comprising the step of engaging the gear clutch of the lowest gear (G1) of the first input shaft (GE1) and the gear clutch of the highest gear (G4) of the second input shaft (GE2), when the motor vehicle has a medium starting load, and accelerating the rotor (6) of the electric motor (EM) in relation to a direction of rotation of the driveshaft (4) of the internal combustion engine (VM) in reverse when starting in a forward direction and in a forward direction when starting in reverse.

18. The method according to claim 14, further comprising the step of engaging the gear clutch (S2') of the highest gear (G5) of the first input shaft (GE1) and the gear clutch of the lowest gear (G2) of the second input shaft (GE2), when the motor vehicle has a low starting load, and accelerating the rotor (6) of the electric motor (EM), in relation to a direction of rotation of the driveshaft (4) of the internal combustion engine (VM) in forward when starting in a forward direction and in reverse when starting in a reverse direction.

19. The method according to claim 14, further comprising the step of engaging a brake (B1) assigned to the first input shaft (GE1) instead of the gear clutch of the first input shaft (GE1) and a brake (B2) assigned to the second input shaft (GE2) instead of the gear clutch of the second input shaft (GE2).

20. The method according to claim 14, further comprising the step of supporting the electric motor (EM) with a running internal combustion engine (VM) in terms of drive technology by at least partial engagement of the decoupler (K) of the internal combustion engine (VM).

21. The method according to claim 14, further comprising the step of impulse-starting the internal combustion engine (VM) when the internal combustion engine (VM) is shifted off by engaging the decoupler (K) when a predefined minimum rotational speed of the internal combustion engine (VM) is either reached or exceeded on the first input shaft (GE1) of the internal combustion engine (VM).

22. The method according to claim 14, further comprising the step of engaging the decoupler (K) when a predefined rotational speed of the internal combustion engine (VM) is reached by the first input shaft (GE1) to assume load by the internal combustion engine (VM) and, in a temporally overlapping manner, increasing the torque of the internal combustion engine (VM) and reducing the torque of the electric motor (EM).

23. The method according to claim 14, further comprising the step of engaging a brake (B) assigned to the electric machine (EM) to have stationary support of a torque transmitted via the second input shaft (GE2).

24. The method according to claim 14, further comprising the steps of engaging the gear clutch of the lowest gear (G2) of the second input shaft in order to start up the vehicle in a forward direction using the internal combustion engine, after the internal combustion engine (VM) has been started and engaging the gear clutch of the inverting stage (R) of the second input shaft is engaged to start the vehicle in a reverse direction and subsequently, engaging the decoupler (K), and after that, decelerating the electric machine (EM), in generator operation with a simultaneous increase in the torque of the internal combustion engine (VM) and the generator torque of the electric machine (EM), until the electric machine (EM) comes to a standstill.

25. The method according to claim 24, further comprising the step of the further accelerating the electric machine (EM), in motor operation, until the gear clutch of a next-higher gear (G3) of the first input shaft (GE1) reaches synchronous operation, engaging the gear clutch of the gear (G3), and then shifting the electric machine (EM) without power, and disengaging the gear clutch of the lowest gear (G2) of the second input shaft (GE2).

26. The method according to claim 14, further comprising the step of accelerating the countershaft (GV2) of the target gear using the electric machine (EM) until the synchronous rotational speed of the gear clutch of the target gear (G4) is reached in internal-combustion engine operation, with a gear change from a gear under load (G3) of the first input shaft (GE1) into a target gear (G4) of the second input shaft (GE2), engaging the gear clutch of the target gear (G4), and increasing the supporting torque of the electric machine (EM) until the gear clutch of the gear under load (G3) is disengagable without power.

27. The method according to claim 14, further comprising the step of initially decelerating the countershaft (GE1) of the target gear (G3, G5) by means of increasing the supporting torque of the electric machine (EM) through an upshift until the synchronous rotational speed in the gear clutch of the target gear (G3, G5) is reached during internal-combustion motor drive operation, with a gear change from a gear under load (G4) of the second input shaft (GE2) into a target gear (G3, G5) of the first input shaft (GE1) and accelerating the electric machine with a downshift by reducing the torque of the electric machine (EM), engaging the gear clutch of the target gear (T3, G3), shifting the electric machine (EM) without power, and disengaging the gear clutch of the gear under load (G4).

* * * * *